United States Patent [19]

Siracusa et al.

[11] Patent Number: 5,371,547
[45] Date of Patent: Dec. 6, 1994

[54] APPARATUS FOR EXCISING (AND REINSERTING) SPECIFIC DATA FROM A COMPRESSED VIDEO DATA STREAM TO REDUCE ITS TRANSMISSION BANDWIDTH

[75] Inventors: Robert J. Siracusa, Lawrenceville; Joel W. Zdepski, Belle Mead, both of N.J.

[73] Assignee: General Electric Company, Schenectady, N.Y.

[21] Appl. No.: 65,233

[22] Filed: May 20, 1993

Related U.S. Application Data

[63] Continuation-in-part of Ser. No. 901,045, Jun. 19, 1992.

[51] Int. Cl.⁵ .................. H04N 7/04; H04N 7/12; H04N 7/00
[52] U.S. Cl. ..................... 348/426; 348/409; 348/384; 370/94.1; 375/122
[58] Field of Search ............ 358/141, 167, 13.3, 358/13.5, 136, 12, 1.3; 375/58, 122; 371/69.1; 370/99, 110.1, 49.5, 83, 94.1, 94.2; 348/426, 438, 419, 415, 409, 408, 403, 400, 401, 397, 390, 384, 394, 420, 470, 607, 608, 467; H04N 7/04, 7/12, 7/00

[56] References Cited

U.S. PATENT DOCUMENTS

| | | | |
|---|---|---|---|
| 4,785,349 | 11/1988 | Keith et al. | 358/136 |
| 4,827,339 | 5/1989 | Wada et al. | 358/136 |
| 5,020,058 | 5/1991 | Holden et al. | 375/122 |
| 5,111,292 | 5/1992 | Kuriacose et al. | 358/133 |
| 5,122,875 | 6/1992 | Raychaudhuri | 358/133 |
| 5,138,440 | 8/1992 | Radice | 358/141 |
| 5,140,417 | 8/1992 | Tauada et al. | 358/133 |
| 5,140,621 | 8/1992 | Perron et al. | 375/122 |
| 5,168,356 | 12/1992 | Acampora et al. | 358/133 |
| 5,189,671 | 2/1993 | Cheng | 370/94.1 |
| 5,231,484 | 7/1993 | Gonzaler et al. | 358/133 |
| 5,253,053 | 10/1993 | Chu et al. | 358/133 |

OTHER PUBLICATIONS

ISO-IEC JT(1/SC2/WG1), Coding Of Moving Pictures And Associated Audio, MPEG 90/176 Rev. 2, Dec. 18, 1990.

*Primary Examiner*—James J. Groody
*Assistant Examiner*—Safet Metjahic
*Attorney, Agent, or Firm*—Joseph S. Tripoli; Eric P. Herrmann; Ronald H. Kurdvla

[57] ABSTRACT

A digital compressed video signal transmission system includes a transport processor for segmenting compressed MPEG video data into transport cells for transmission. Prior to formation of the transport cells, at least a portion of the 32-bit MPEG slice start codes are excised from the compressed data. An entry pointer is generated to indicate the location of the beginning of a slice, which pointer is included in a transport cell header. In a corresponding receiver, the transport header is examined for a slice entry pointer, and if one is found, a slice start code is inserted in the transport payload data stream at the location indicated by the pointer so as to provide a signal according to the MPEG protocol.

6 Claims, 10 Drawing Sheets

FIG. 5

| ENTRY-POINT DATA (32 BITS) | | | | |
|---|---|---|---|---|
| ENTRY POINTER | FRAME TYPE | FRAME NUMBER | UNASSIGNED | SLICE/MBLK ID |
| 7 BITS | 2 BITS | 5 BITS | 5 BITS | 13 BITS |

APPARATUS FOR EXCISING (AND REINSERTING) SPECIFIC DATA FROM A COMPRESSED VIDEO DATA STREAM TO REDUCE ITS TRANSMISSION BANDWIDTH

This is a continuation in part of Ser. No. 07/901,045, filed Jun. 19, 1992. The present invention relates to a method and apparatus for segmenting compressed video data into cells or packets for transmission in a manner to allow a receiver to rapidly recover froth occurrences of missing data or corrupted data.

BACKGROUND OF THE INVENTION

The Moving Picture Experts Group (MPEG) are establishing a standard for transmission and storage of video data primarily for use by computers. This proposed standard is detailed in the document "International Organization for Standardization", ISO-IEC JT(1/SC2/WG1), Coding of Moving Pictures and Associated Audio, MPEG 90/176 Rev.2, Dec. 18, 1990. The signal protocol is hierarchical or layered. Frames of video data are compressed in groups of, for example, 15 frames. Respective frames are either intraframe encoded (I frames), forward predictive interframe encoded (P frames) or forward/backward predictive interframe encoded (B frames). Each frame is divided into slices corresponding to horizontal image bands (e.g., 16 line stripes). The slices are segmented into macroblocks consisting of matrices of 16 by 16 pixels. The macroblocks are encoded in four 8 by 8 blocks of luminance values, and two 8 by 8 blocks of chrominance values (U and V signal components). Each of the 8 by 8 chrominance blocks are derived by horizontally and vertically subsampling component chrominance values representing respective 16 by 16 macroblocks. The signal protocol calls for a sequence layer for identifying the overall signal type, which layer includes a sequence start code and header information identifying, for example, picture size, pixel aspect ratio, picture rate, bit rate, buffer size, a number of flag bits, etc. Following the sequence layer is a group of pictures, GOP header which include a start code, a time code, a closed GOP flag, a broken link flag and extension data. The next layer includes a picture start code and picture header. The picture (PICT) header includes a temporal reference, picture coding type (I, P, B), buffer fullness, vector and pixel precision flags, variable length code identifiers and extension data. A slice start code follows the picture layer and includes a start code and a header identifying the slice. Following the slice layer is the macroblock layer which includes a start code and header data. The macroblock header data includes identifying indicia, quantizing information, type of encoding etc. The macroblock layer also includes motion vectors which are common to the six blocks of data in each macroblock, and encoded block data on a block by block basis. The compression algorithm involves predicting frames of video signal from prior frames of video signal and transmitting in compressed form, the differences between actual and predicted frames. Successively encoded frames are dependent on the correctness of prior encoded frames.

ADTV is a fully digital simulcast system that delivers high definition television (HDTV) in a single 6-MHz broadcast channel. It is currently being developed by the Advanced Television Research Consortium (ATRC). One of the primary design goals of ADTV is to deliver high-quality and robust digital HDTV service for terrestrial simulcast transmission. The ADTV system uses MPEG compression to permit transmission of HDTV signals within a 6-Mhz channel. However the ATRC has augmented MPEG by adding a custom higher layer structure (MPEG++Rev 1) to achieve sufficient signal robustness for transmission over noisy terrestrial transmission media. This augmentation includes the prioritization of MPEG data into a two tier high-priority (HP), low priority (LP) transmission scheme, and includes a transport protocol to support multiple data services, and to provide graceful degradation in receiver performance in the presence of transmission errors.

DirecTV is a fully digital system that delivers standard definition NTSC television to the home over a satellite channel. It is currently being developed by Thomson Consumer Electronics (TCE). It is similar to ADTV in that it uses MPEG data compression but it is not HDTV. This is a one tier system, for transmitting NTSC quality television signals

SUMMARY OF THE INVENTION

The present invention involves a transport protocol for arranging hierarchically formatted compressed video data for robust transmission in noisy communication channels and apparatus for realizing the transport protocol. The transport protocol presented here defines cells of data where each cell includes a Transport Header and a payload of compressed video data. Compressed video data is applied to a transport processor which is responsive to the header data in the compressed video signal to develop transport headers which identify the particular video data comprising respective payloads. The transport processor also excises particular header data from the compressed video data prior to formation of respective payloads to eliminate some redundancy in respective transport cells.

In a further embodiment arranged at a transport cell receiver, circuitry is arranged to decode respective transport cell header information, and responsive thereto to generate and reinsert compressed video data header data that was excised at the transmitter.

BRIEF DESCRIPTION OF THE DRAWINGS

FIG. 5 is a schematic representation of the entry-point data in two-tier transmission systems.

DETAILED DESCRIPTION

The transport protocol of the present invention includes three data protocol layers; a link layer; a transport layer; and a service layer. The link layer is arranged to be service independent, while the service layers are service specific. A "service" refers to the type of data being transmitted in a particular transport cell, e.g., audio data, video data, auxiliary data etc.

Figure 1:
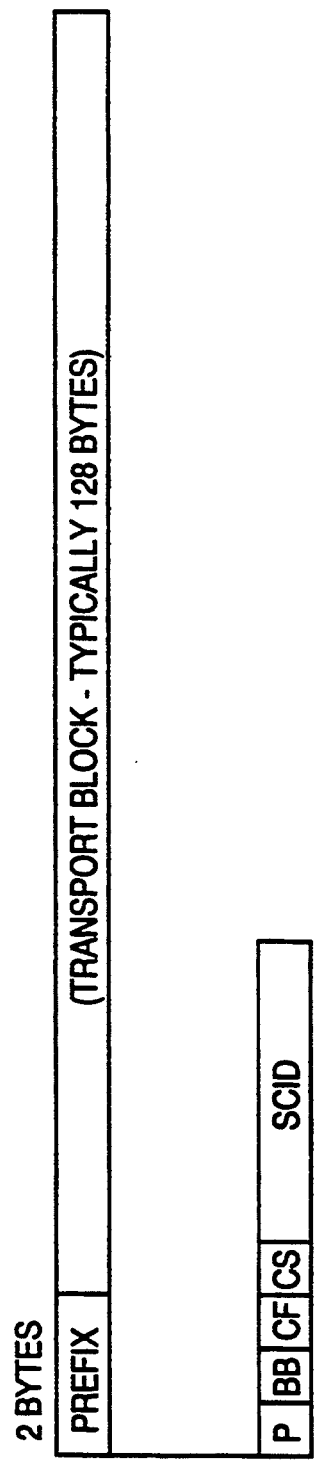
FIG. 1 is a schematic representation of a transport cell of the transport layer utilized in the invention.

The link layer comprises a Prefix byte (actually two eight bit bytes) which contain several link layer control flags as well as channel identifiers for many different video, audio and data services. FIG. 1 shows the logical structure of a transport cell indicating the relationship between the Prefix and the Transport Block. The designators P, BB, CF, and CS are all one bit designators. The designator, P, is used in a two tier system to identify whether the transport block includes high or low priority data (1=HP, 0=LP), and is used in a one tier system for cell framing by toggling in successive cells. The designator, BB, defines a bundle boundary and is set to a "1" value only for the first cell of respective bundles. The designator, CF, is a control flag used to indicate a scrambling state. CS is a control sync bit which toggles with each scramble key change.

The designation SCID is a twelve bit word which is used to identify service types. A SCID value of zero is reserved for null cells, and the value 4095 is reserved for future definition. The remaining 4094 SCID values are available for defining various service types.

Figure 2:
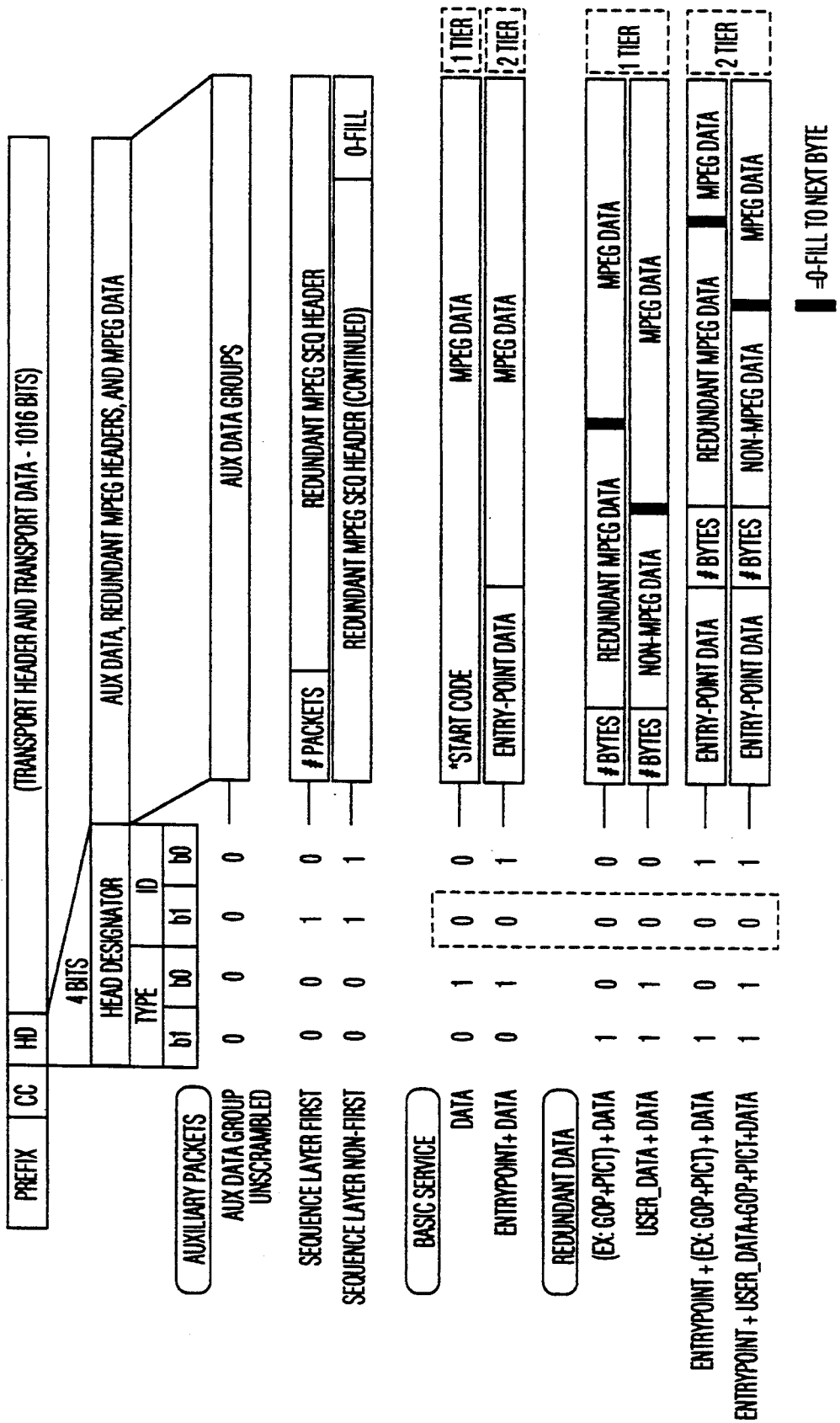
FIG. 2 is a schematic representation of a Transport Block for a video service included in a transport cell.

FIG. 2 illustrates the Video Transport Layer which is an example of one of many possible Transport Layer formats. Every service type can have a specific Transport Block format. This description pertains to MPEG encoded Video Transport services. FIG. 2 shows the logical structure of a transport block. The first field of the video transport layer contains a 4-bit continuity counter (CC). This counter increments by one for each cell transmitted. It is service dependent and priority dependent, i.e., separate counters are maintained for each service identity and for each transmission priority tier. The value of the continuity count sequences from 0 through 15. The continuity count provides a measure of error detection at respective receivers. A discontinuity in the received count indicates either errors in received data or a loss of continuous data for a particular transport service.

The next field in the video transport layer contains a 4-bit Header Designator (HD) which has two-bit subfields of Type and Identity. The subfields identify the form of data transmitted in the respective data field. For the Video Transport Layer, HD types 0, 1, 2 and 3 are used to respectively identify Auxiliary Packets, Basic Service Packets, Basic Service Packets with MPEG redundant data, and Basic Service Packets with NON_MPEG redundant data. The latter two types are non standard forms of transmitting MPEG data, and are included for completeness. The type "Basic Service Packets" (or Cells) is the only type identified which includes MPEG data in standard form albeit segmented in transport cells The type "Auxiliary Packets" in general is not an MPEG signal though in this application it is used to transmit redundant MPEG header data. Nominally the Auxiliary Packets are used to transmit auxiliary data such as closed captioning data, for example.

Figure 3:
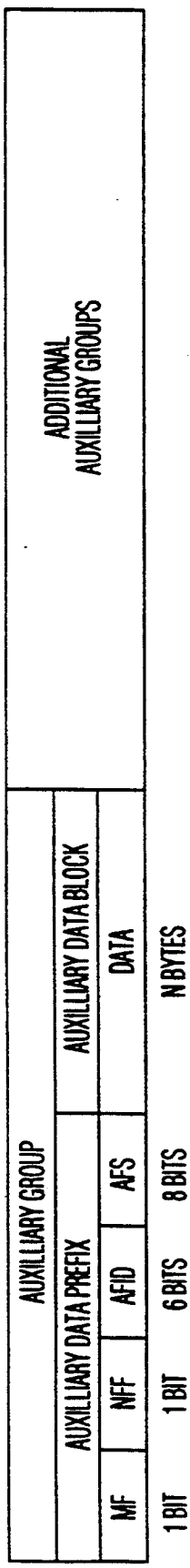
FIG. 3 is a schematic representation of an example of a format of Auxiliary Data cells.

The HD identity values define subsets of the HD types. One HD type/identity value combination (0/0) indicates an Auxiliary Data Group cell, and its contents are defined in FIG. 3. The fields of auxiliary data cells are to be unscrambled, therefore PREFIX bit CF is set to one. Each Data Group is self defined, with a flag-bit indicating whether additional Data Groups exist in the same cell. Data Groups contain such information as Time Code References, and Scramble Keys.

Figure 4:
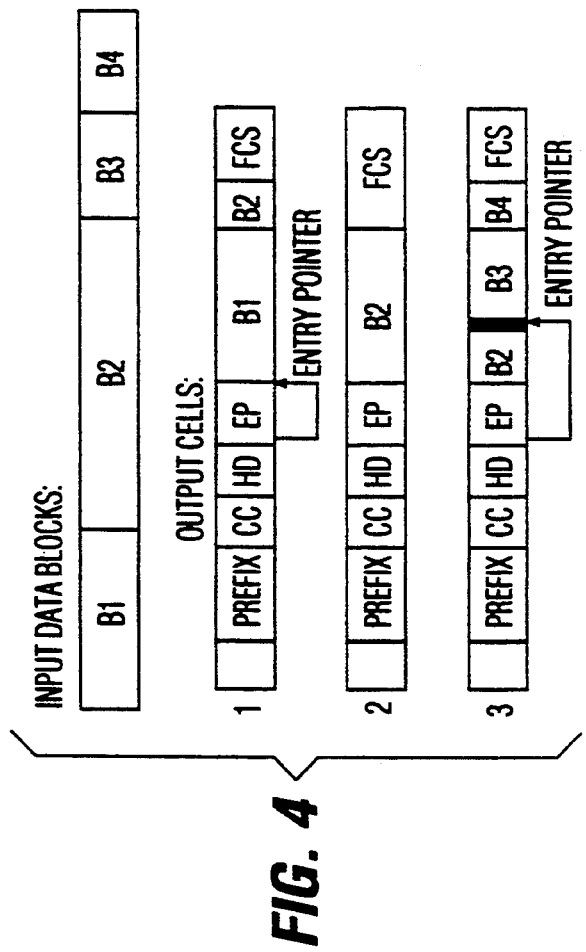
FIG. 4 is a schematic representation illustrating an entry-point concept utilized for fast re-entry into the compressed data stream.

Basic Service cells are used to carry most of the MPEG encoded data. Two-tier basic service cells include entry-point data to synchronize the two data streams. Entry-points allow data blocks to segment across cell boundaries. This concept is illustrated in FIG. 4. FIG. 5 shows the entry-point components found in the entry-point data field for two-tier transmission schemes. The frame type, slice, and macroblock identities are supplied by the video processor, while the entry pointer and frame number are supplied by the transport processor. The entry pointer is the byte offset to the entry-point position in the transport block. Frame type indicates whether the data refers to an intraframe encoded frame or an interframe encoded frame, or the first cell of a GOP. The frame number is used as a frame continuity counter, incrementing once per frame. Both the frame type and the frame number assist decoder synchronization of the two-tier data streams. The slice and macroblock identities are unique over the frame, and specify the entry-point position without decoding the MPEG data stream. While having one entry-point per cell is a design goal, there is a wide range of data per slice dependent upon the priority channel and frame type. For further information on entry point processes, see U.S. Pat. No. 5,168,356.

Two methods of carrying redundant MPEG data in the Transport Cell may be utilized. One method uses a specific Auxiliary Packet to carry a copy of the MPEG sequence Header (which could span multiple cells). The second method uses a modification of the Basic Service Transport Block to carry a copy of MPEG Group of Pictures (GOP) Header and Picture Header.

All information contained in the video service layer is supplied by the video encoder (and the priority processor in a two tier system). See U.S. Pat. No. 5,168,356 for a detailed description of a two tier system.

Specific formatting rules are required when encoding the Video Transport Block and are outlines below:

For HD Types 1, 2, 3 the HD ID bit 1 is toggled on the first sequence header of a GOP, the start of a B-Frame, and the start of a P-Frame.

A new cell is started at the beginning of a GOP (assuming GOP begins with an I-Frame), and the beginning of respective successive frames.

A "Basic Service" transport block format is used on the first cell of a GOP, and the first cell of respective successive frames.

A "Redundant Data" transport block format is used instead of the "Basic Service" format on the second cell of a frame if the frame spans multiple cells. The "Redundant Data" format is used again at an interval of about 4 to 8 times per frame.

The redundant transmissions of the MPEG Sequence header are carried as "Auxiliary Packets" at an interval of 5 to 30 per second.

Figure 6:
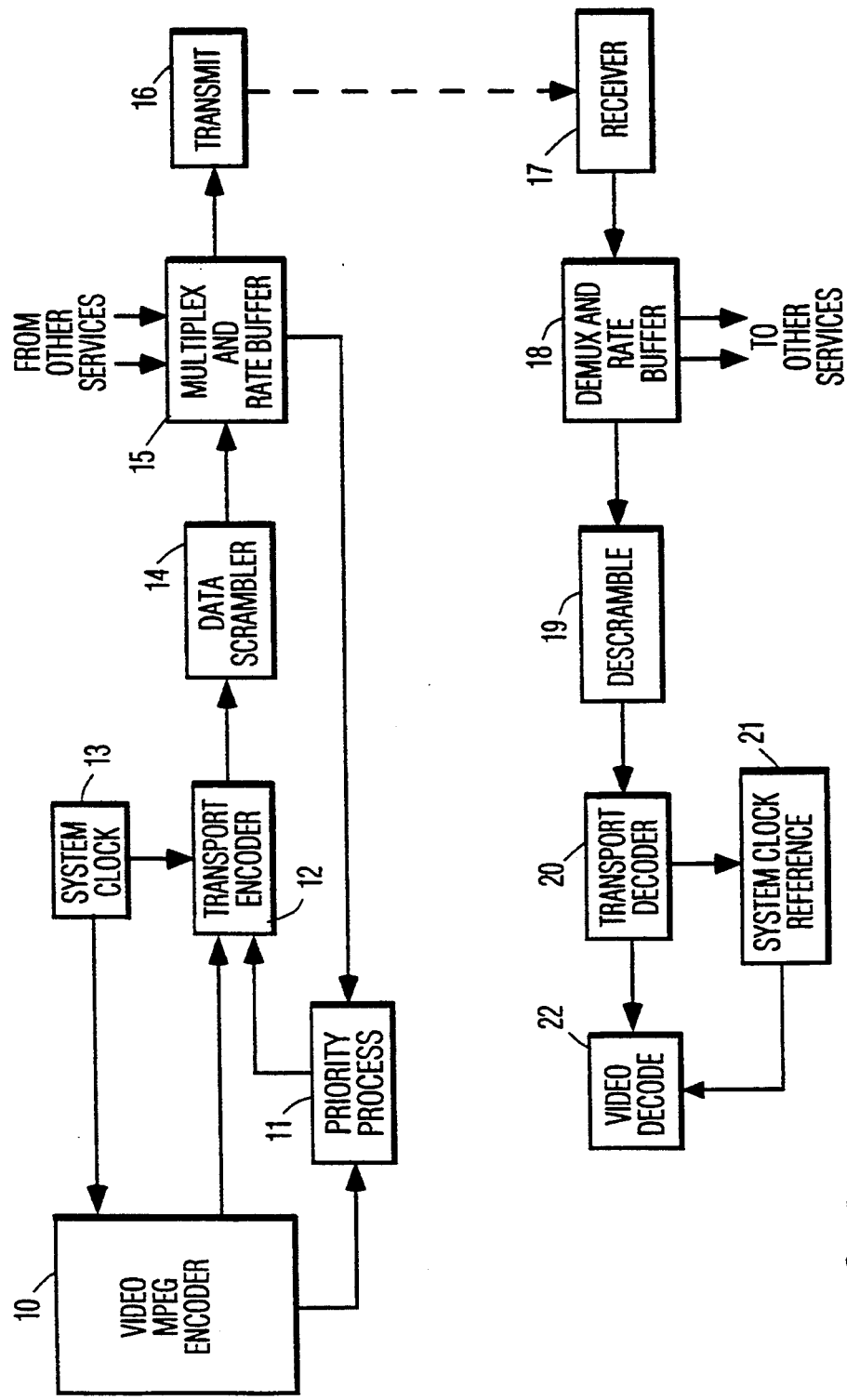
FIG. 6 is a system level block diagram identifying the transport encoder and decoder in the total system.

FIG. 6 is a block diagram of MPEG encoding apparatus including a transport encoder according to the present invention. The transport encoder takes a MPEG data stream and attaches a protocol which:

Allows a transport decoder to detect missing or invalid data;

Offers redundant transmission of critical data; and

Indicates data reentry points to restart MPEG decoding.

Input to the transport encoder 12 is either directly from an MPEG encoder 10 (for a one tier transmission system) or from a MPEG priority processor 11 (for a two tier transmission system). In this application only one tier systems will be described though the invention is equally applicable to two tier systems. The MPEG encoded data is applied as input data to the transport encoder 12. A further input to the transport encoder 12 is provided by a system clock 13. This clock is incorporated to genlock the receiver and transmitter so decoder rate buffers do not overflow or underflow. Responsive to the MPEG data and the data provided by the system clock, the encoder 12 forms the respective transport cells.

Output from the transport encoder 12 is sent to a service multiplexer and rate buffer 15 via a data scrambling mechanism 14. The multiplexer 15 interleaves data from different service sources. The output from the multiplexer 15 is applied to the communications channel via a transmitter 16.

A transport decoder receives cells from the communication channel receiver 17 via the service demultiplexer and rate buffer 18. The demultiplexer responsive to the data in the service type field of the transport cell header, separates data of different service types, and applies the separated data types to the appropriate processing circuitry. Video output data from the demultiplexer 18 is coupled to a descrambler 19 which performs a descrambling function which is inverse to the scrambling function of element 14. Descrambled data is applied to a transport decoder 20, which separates header data from service data and applies the service data to a decoder 22.

Output from the transport decoder 20 provides both a system clock (21) for synchronizing the receiver to the transmitting service, and a data path to the MPEG decoder 22. Within the transport decoder, error checks are performed to determine whether a cell has been lost or includes errors. For example, the CC code is monitored to determine if respective transport cells occur in proper sequence. Only payloads from transport cells for which no errors are detected are delivered to the MPEG decoder. The transport decoder separates transport header data and MPEG payloads, and presents data to the MPEG decoder in a suitable format. If there is a cell discontinuity, the video transport decoder is programmed to initiate a sequence of resynchronizing tasks, as discussed below.

Figure 7:
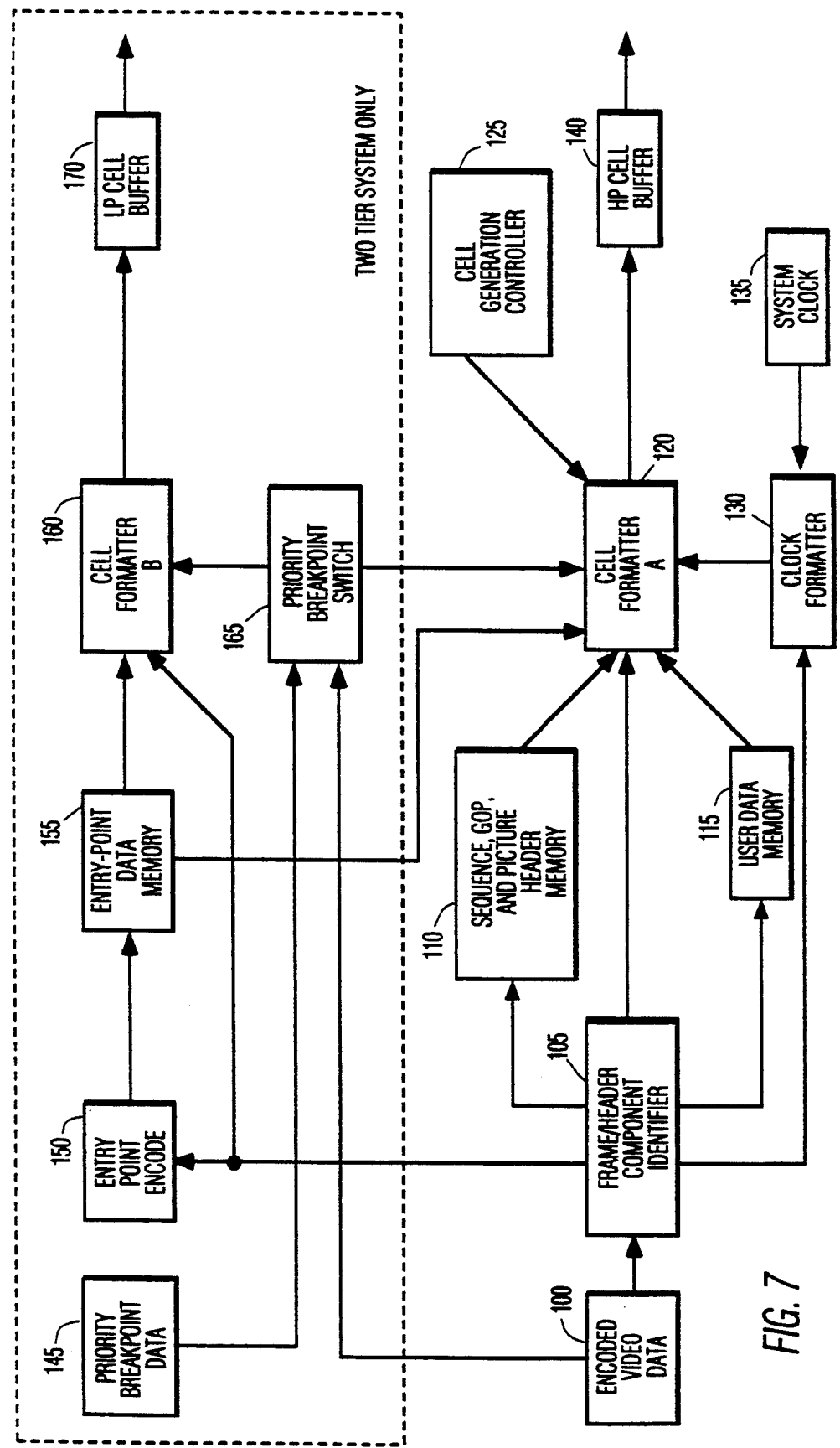
FIG. 7 is a block diagram of a typical transport encoder.

FIG. 7 is a block diagram of a typical transport encoder utilized in, for example, the ADTV or DirecTv systems. In these systems the MPEG data is provided with extra indicia which identify the respective codeword types and the encoder is programmed to recognize the "type" data in performance of transport cell formation. In a more general application, MPEG data type indicia will not be available with the MPEG data, and the encoder will include partial decoder apparatus to identify particular types of codewords. Such decoder apparatus will nominally include a simple decoder to recognize particular MPEG start codes and a byte counter. Each layer of the MPEG data begins with a particular start code. The relevant data necessary to form transport headers is arranged in a particular sequence after respective MPEG headers. Thus as respective headers are detected the encoder will be programmed to count predetermined numbers of bytes of the MPEG data to access desired information.

Encoded video codewords, and corresponding codeword identifying indicia related to codeword type, and codeword length arrive at the transport encoder from the video encoder 100. Element 105, responsive to the identifying indicia captures and stores certain of the header information in a memory element 110. Data stored in element 110 will be included in the transmitted data a plurality of times to provide a degree of information redundancy. The data selected for redundant transmission generally includes sequence header data, GOP header data, and Picture header (PICT) data. At a minimum the data selected as redundant data is that data necessary to condition an MPEG decoder to begin decoding a data stream which has been entered at other than the beginning of a data sequence.

Nominally a sequence may include a large number of GOP's. Decoding of transmitted MPEG data requires use of the sequence header data. If the user tunes into a program (service sequence) after the occurrence of the sequence header, he may not be able to decode the subsequent data. The transport protocol described herein repeatedly provides sequence and other needed header data for decoding shortly after entering the transmitted data stream no matter where it is entered.

Element 105 also extracts user data and applies this data to a memory 115. User data may be of many different types such as time stamps; whether the images are in color or not; the form of chrominance preprocessing; whether the original source material was film mode or video mode etc.. The MPEG protocol does not support inclusion of these types of information. However inclusion of such information permits the receiver designer to incorporate special processing for particular signal types and thereby enhance the overall reproduction of images. The user data is included in auxiliary transport cells, when convenient.

Element 105 provides header identifying indicia to a clock formatter 130. Clock formatter 130 includes a clock which is sampled on the occurrence of certain header data to generate time stamps associated with the corresponding header data. These time stamps are used in receiver apparatus to provide a measure of signal synchronization.

Data from elements 105, 110, 115 and 130 are coupled to a cell formatter 120. Nominally formatter 120 receives data from element 105, parses such data into cell length packages or payloads, develops the appropriate video service transport headers according to the protocol indicated in FIGS. 1 and 2, concatenates the transport headers and the payloads, and couples the transport cell to a cell buffer 140. However, at the start of a sequence of data, and periodically during the transmission of data, the formatter is conditioned by the controller 125 to form and transmit other data. This other data includes auxiliary information such as time stamps from the clock formatter 130 for signal synchronization, and redundant header data stored in memory element 110.

Auxiliary data cells are generated as needed and included in the data stream when space is available. That is, auxiliary data cells may be interleaved with video data in any of the I, P or B field data. On the other hand redundant data is for the most part interleaved only with I field video data. This is because decoding of video data must start with an I field. All other fields of MPEG data are predictive and depend from I fields. The redundant data cells may be included at regularly spaced intervals or as data space is available but with at least a certain minimum inclusion of data to provide enough information to indicate decoding.

The cell formatter includes a continuity count in each transport cell regardless of type. The continuity count, CC, is incremented by one unit in successive cells and repeats modulo N, where N may be a convenient binary number such as 16.

Actual pixel representative MPEG data is arranged in blocks, and these blocks are arranged in groups of e.g., six, which groupings are designated macroblocks. The macroblocks are arranged in groups designated slices. A video frame may include upwards of 100 slices. Each slice begins with a start code consisting of 32 bits, 24 of which are invariant and 8 of which identify the particular slice. An exemplary slice start code is given by 0000 0000 0000 0000 0000 0001 xxxx xxxx. The x's represent the variable part of the slice start code. Consider for demonstration purposes that a frame includes 100 slices and 30 frames are processed a second. The slice start codes alone will require a data rate of 96 kilobits per second which is not insignificant. In order to provide extra bit capacity for conveying redundant header data, or wider bandwidth information, it is efficacious to excise at least a portion of the slice start codes that are included in the transport payloads.

Note from FIG. 5 that the transport protocol includes a slice identification in the transport header, hence a start code is not necessary in the payload for transport purposes. However the beginning of a slice is a data entry point or re-entry point as certain DPCM coded data within a slice is referenced to the start of a slice in the MPEG signal format. It is therefore necessary to include a pointer in the transport header to the start of respective slices, as portions of two blocks may be included in a payload.

In a first embodiment of the invention, the encoder excises the invariant portion of the slice start code from the compressed video data included in the payload, but includes the variable portion of the start code. In a second embodiment the entire slice start code is excised. These operations are executed by the elements 105, 120 and 125 of FIG. 7.

Figure 8:
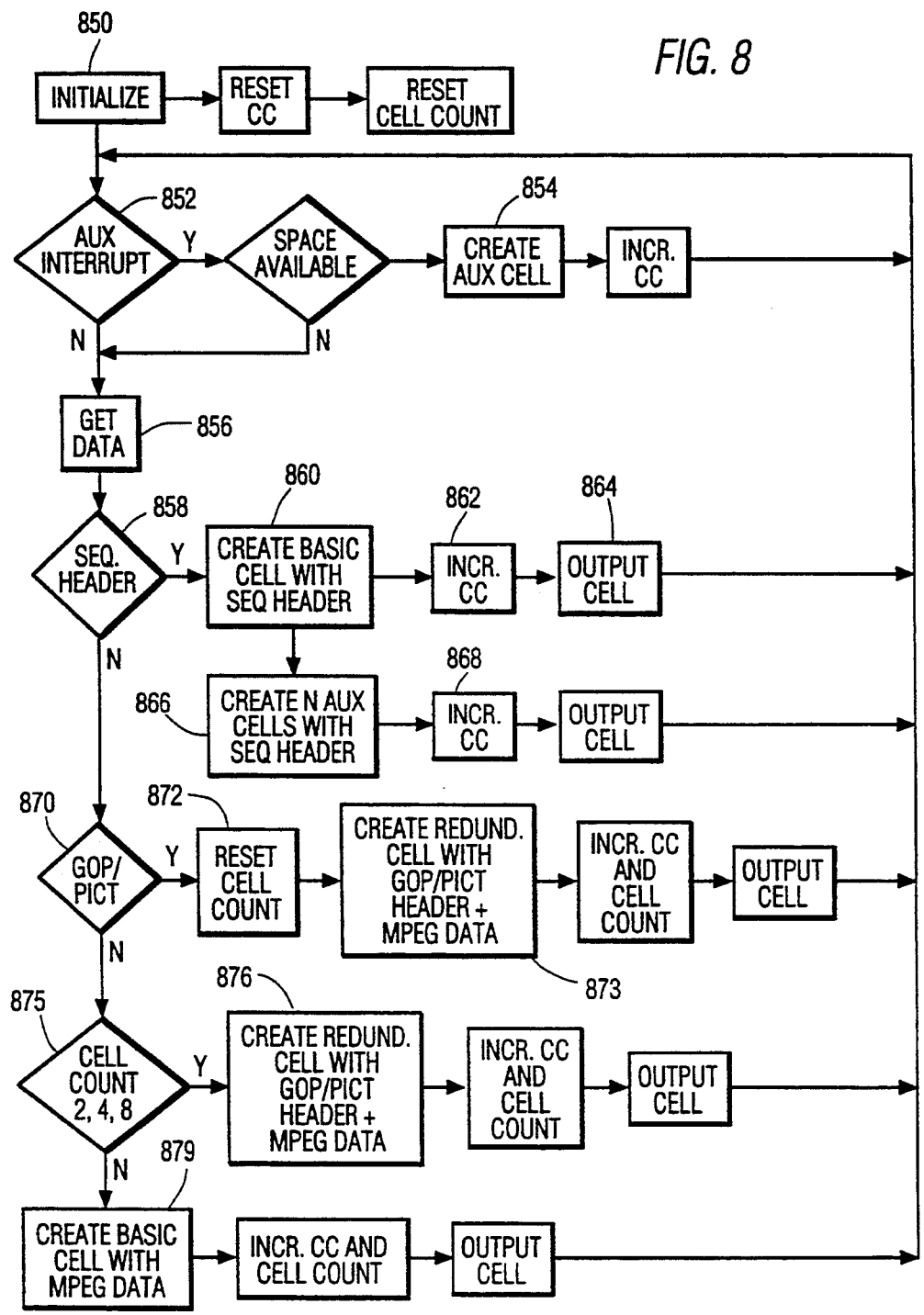
FIG. 8 is a flowchart representing operation of the transport encoder.

Referring to the flowchart of FIG. 8, the controller 125 initializes the system (850) by resetting the continuity counters (CC) and a cell count. It then checks (852) for an auxiliary data interrupt. These interrupts allow the user to interpose special information (if desired) for transmission. If an auxiliary interrupt has occurred, an auxiliary cell is created (854) and coupled to the rate buffer, and the auxiliary CC is incremented. If there is currently no channel space available, the system is directed to access MPEG data (856).

The MPEG data is checked for the occurrence of a sequence header (858). If a sequence header is available, a basic cell type is created (860) using the sequence header data. The basic cell continuity counter is incremented (862) and the cell is output (864) to the rate buffer. Following creation of the basic cell type with the sequence header data, N auxiliary type cells are created using the sequence header data. Here N is a small integer such as four. Each of the N auxiliary type cells are output, and the auxiliary continuity count is incremented with the production of each cell.

Alternatively, if sequence header data is not available, a test is performed to determine the occurrence of group of picture (GOP) or picture (PICT) header data (870). If GOP/PICT header data is available the cell count is reset (872) and a redundant type cell is created with the GOP/PICT header data (873). If space is available within the cell further MPEG data is included. The cell is output and the redundant cell continuity count and the cell count are incremented. Note at tests 858 and 870 if sequence headers or GOP or PICT headers are available, they are stored in memory element 110 for use in forming redundant cells of the same data.

If at test 870 the current MPEG data is not GOP/PICT header data, the cell count is tested. If the cell count is not, for example, 2, 4 or 8 then a basic type cell is created with the current MPEG data. Alternatively, if the cell count is 2, 4 or 8 then a redundant type cell is created with the last occurring GOP/PICT header data.

Table I shows an exemplary sequence of transport cells.

TABLE I

| RHD class | Cell Contents |
|---|---|
| Basic | Sequence Header or GOP Header with MPEG data |
| Aux | Redundant Sequence Header Transmission #1 |
| Aux | Redundant Sequence Header Transmission #2 |
| Aux | Redundant Sequence Header Transmission #N |
| Redundant | Redundant GOP/PICT Header + MPEG Data |
| Redundant | Redundant GOP/PICT Header + MPEG Data |
| Basic | MPEG Data |
| Redundant | Redundant GOP/PICT Header + MPEG Data |
| Basic | MPEG Data |
| Basic | MPEG Data |
| Basic | MPEG Data |
| Redundant | Redundant GOP/PICT Header + MPEG Data |
| Basic | MPEG Data |
| Basic | ( . . . a number of MPEG data cells) . . . ) |
| . | . |
| . | . |
| . | . |
| Basic | Picture Header within MPEG Data |
| Redundant | Redundant GOP/PICT Header + MPEG Data |
| Redundant | Redundant GOP/PICT Header + MPEG Data |
| Basic | MPEG Data |
| Redundant | Redundant GOP/PICT Header + MPEG Data |
| Basic | MPEG Data |
| Basic | MPEG Data |
| Basic | MPEG Data |
| Redundant | Redundant GOP/PICT Header + MPEG Data |
| Basic | MPEG Data |
| Basic | ( . . . a number of MPEG data cells . . . ) |
| Basic | MPEG Data |

Information (except video data) necessary to generate the sequence of transport cells shown in Table I is programmed into the cell formatter 120 and the controller 125. Responsive to respective start codes, the formatter and controller are conditioned to produce frame specific sequences of transport cells, and responsive to the type of transport cell to be generated appropriate transport header information is accessed from, e.g., internal memory or continuity counters. Also responsive to the programmed sequence, the controller and cell formatter are conditioned to process newly occurring compressed video data or stored header data. Note, once the transport cell sequence is established, forming the requisite transport cells involves simply time division multiplexing the relevant data.

Whether or not the slice start codes are excised from the payload data, the elements 105, 120 and 125 must be arranged to recognize slice start codes and extract the variable portion thereof to form the SLICE/MBLK ID (FIG. 5) which identifies the slice contained in the payload. Once the location of the slice start code is identified, excising same from the payload is simply a matter of excluding the first three bytes of the start code (first embodiment) or all four bytes of the slice start code (second embodiment) when the compressed video data is provided to the cell formatter. In either instance the fourth byte of the slice start code is utilized in forming the SLICE/MBLK ID for the transport header. In addition, whether or not slice start codes are excised, the elements 120 and 125 must be arranged to generate a pointer indicating the location of the start of a slice in respective payloads. This is simply a matter of counting byte positions from the beginning of a payload to the beginning of a slice (with or without start codes) and, if desired, offsetting this count by the number of bytes in the transport header preceding the payload. This count is then included in the Entry pointer field of the transport header (FIG. 5). Note, even though much of the MPEG compressed video data is variable length coded, the slice start codes, if included, or the beginning of the slice if the start codes are not included, are byte aligned to simplify establishing the entry pointer at the coder and to simplify finding the entry point at the decoder.

Figure 9:
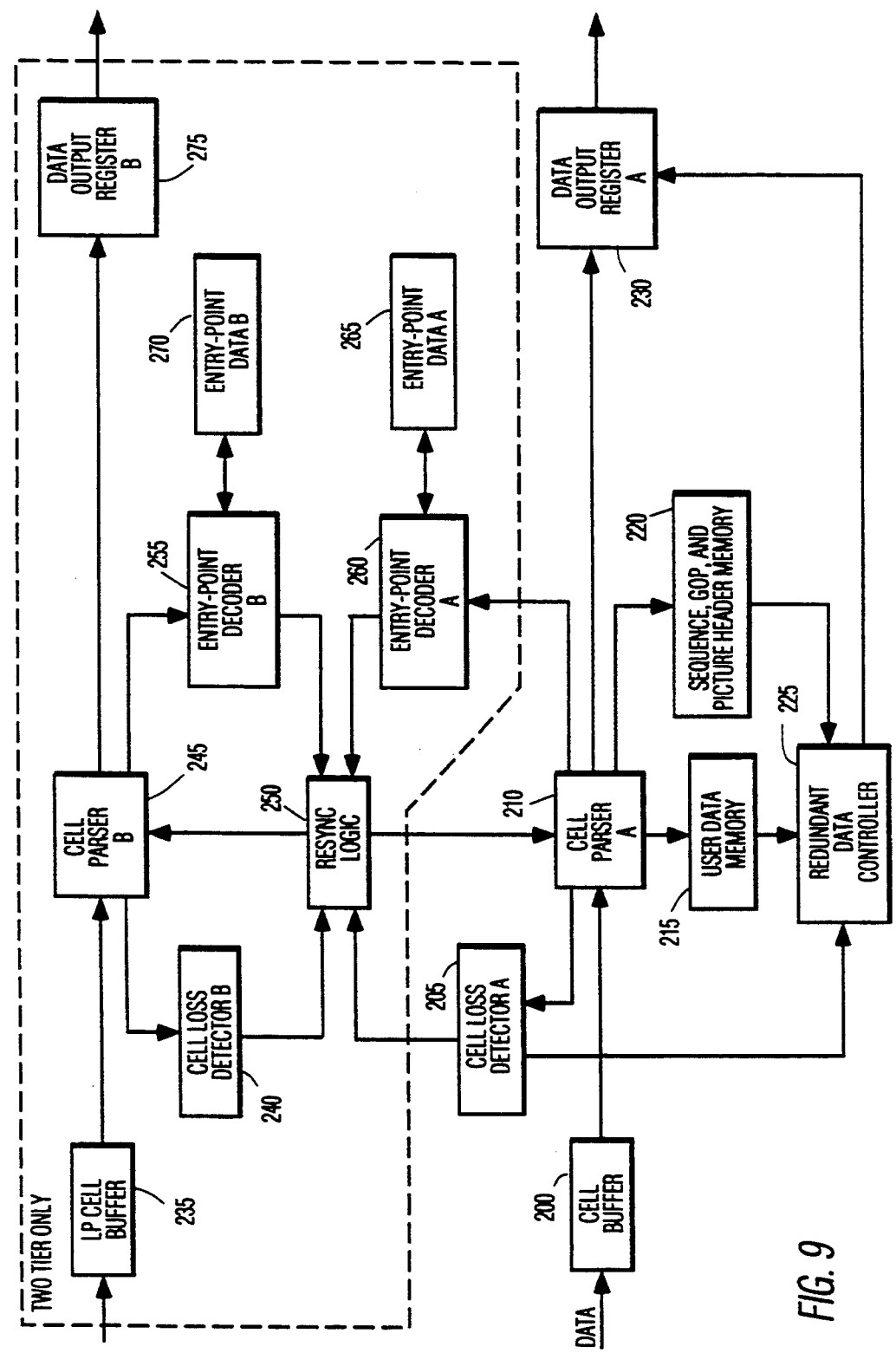
FIG. 9 is a block diagram of a typical transport decoder.

FIG. 9 is a block diagram of a typical transport decoder. As indicated previously, respective cells include cell Continuity Counts (CC) to provide a minimal indication of whether a cell has been lost or corrupted during transmission. Additional loss indications may be provided by error detecting cyclic redundancy codes or forward error correcting appended to respective transport cells. Only errorless transport cells are delivered to the video decompressor. The video transport decoder removes entry-point data and transport header data from respective transport cells, decodes the entry and transport header data, and responsive thereto provides data to the MPEG decoder in a suitable format. If there is a cell discontinuity, the video transport decoder is conditioned to initiate a sequence of resynchronizing tasks, as discussed below.

Transport cells are provided to the transport decoder via a transport cell buffer 200. Programmed to respond to the encoded protocol, a cell parser 210 decodes the cell headers and separates respective service types of data. Auxiliary user data is directed to and stored in a memory 215. Redundant MPEG Sequence headers, GOP headers, and Picture headers are directed to and stored in a further memory 220. Normally occurring MPEG data (from basic service cells) is passed to an output register 230 from which it is supplied to the MPEG decoder. Based on an indication of cell loss in function 205, and the redundant data stored in memory 220, the redundant data controller 225 will supply error tokens followed by the appropriate redundant data from memories 215 and 220, to condition the MPEG decoder to continue decoding or resynchronize.

The cell parser 210 extracts entry point and transport header data from occurring transport cells. The entry data is stored in the memory 265. The transport header is examined to determine if the payload contains slice data, and if so a stored version (memory 265) of the invariant portion of the slice start code is inserted in the compressed video data at the byte location designated by the entry pointer. If the particular system excises the variable part of the slice start code, this information is accessed from the transport header data (SLICE/MBLK ID) and appended to the stored invariant portion of the start code, which is then inserted into the compressed video data at the byte location designated by the entry pointer. After reinsertion of the slice start code, if no cell loss is indicated by the continuity count the entry data is subsequently discarded. If cell loss is indicated the entry point data is utilized to re-enter the respective data streams at the next decodable piece of data. Re-entry is performed by element 260 and the resynchronization logic 250. The resynchronization logic, during a resync cycle, in effect conditions the cell parser to skip/discard data up to an entry point, and thereafter apply the next successive data to the register 230 as appropriate. For example, a cell loss would require resync logic 250 to condition the cell parser 210 to skip over bits in the next good cell until reaching data positioned at the entry-point of that cell designated by the transport header. Then data at that entry-point is provided to output register 230.

Figure 10A:
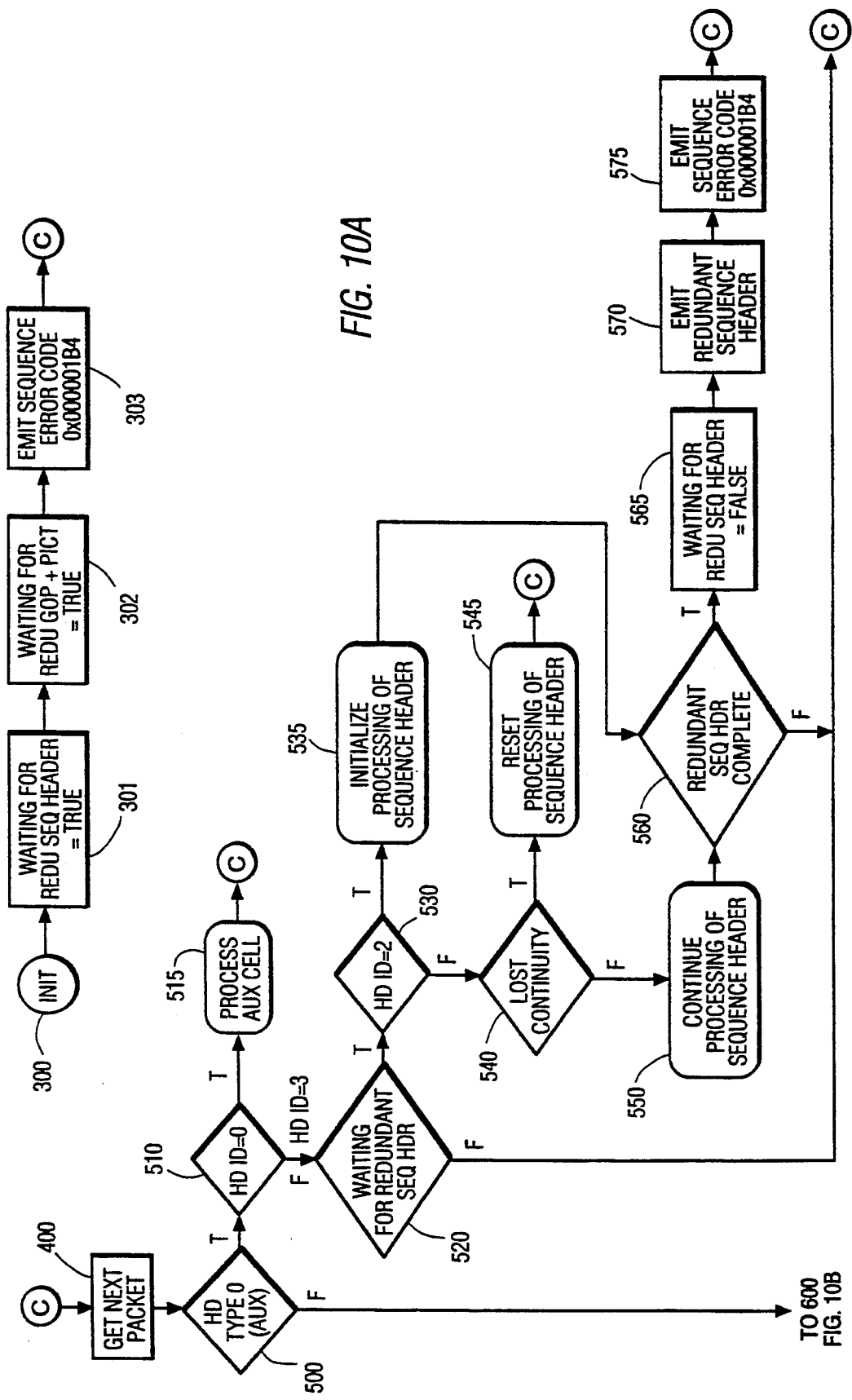
FIGS. 10A and 10B are a flowchart of operation of the transport decoder of a one-tier video system.
Figure 10B:
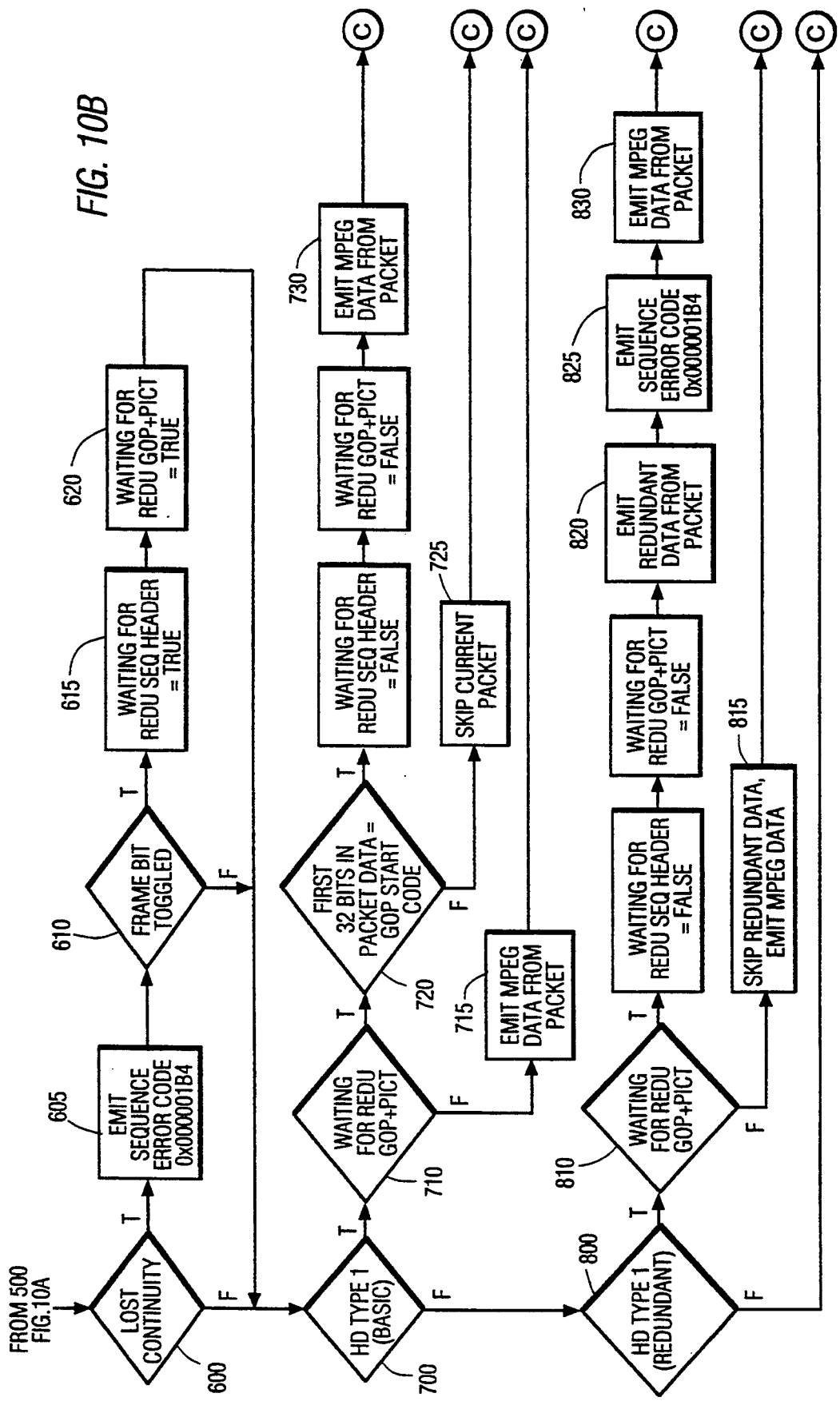

FIG. 10 shows a typical transport decoder algorithm. This algorithm includes an initialization sequence (300), and functions to process each cell (beginning at 400). The initialization sequence 300, sets (301, 302) two flags, which control waiting for redundant MPEG data in the transport protocol, to a "false state". Initialization also produces (303) an error code to the MPEG decoder, so that the MPEG decoder is conditioned to wait for the next start-code when decoding resumes. This is a sequence or GOP start code not a slice start code.

On completion of initialization, the system begins (400) processing respective transport cells. In this example, there are three possible processing paths dependent upon the state of the Header Designator (HD) in the respective cell. For HD type 0 (Aux cells), processing begins at decision stage (500), for HD type 1 (Basic cells), processing begins at decision stage (700), and for HD Type 2 (Redundant Cells), processing begins at decision stage (800). There is a check for lost cell continuity at decision stage (600) before processing of the MPEG data cells begins at points (700) and (800).

Auxiliary cell processing begins at decision stage (500). A test is performed on the AUX Header Designator Identity. If the identity is 0 (test 510), then this cell contains an auxiliary data group, and the cell is processed at function (515). If at test (510), the Identity is not 0, then a test (520) is employed to determine if the decoder is waiting to recover redundant Sequence Header information. If not, the algorithm proceeds to the next cell at (400). If a Sequence Header is needed, and this cell marks the start of a Sequence Header (test 530), then the decoder initializes the processing of this header (535), checks to see if processing is completed at test (560), (for the case where all Sequence Header data was contained in one cell), and if so, sets the waiting-flag to false, outputs the header (570), and then provides another error token (575). This error token conditions the MPEG decoder to be prepared to start processing at a new entry-point. During the capture of a multiple cell AUX Sequence Header, a check on the cell continuity is performed (540). If there has been a loss, the Sequence Header processing is reset (545), else data is extracted from the AUX cell to continue processing of the Sequence Header (550). Thereafter the sequence header is again checked for completeness (560).

Before MPEG data cells are used, a check is made (600) for lost continuity. If there is a loss, an error code is provided (605) to the MPEG decoder and a check is made on Prefix bit P (610) for entering a new frame. If a new frame has been started during the loss, control flags are set true (615, 620) waiting for redundant MPEG headers.

If the cell is a Basic cell type (test 700), a check is made (710) to determine if the decoder is in a state waiting for redundant GOP+PICT headers (710). If it is not waiting for redundant headers, the MPEG data cell is forwarded (715) to the MPEG decoder. At this juncture the transport cell is examined for slice data and an entry point. If both are included in the corresponding transport header, a slice start code is inserted in the compressed video data at the byte location designated by the entry pointer.

If the decoder is waiting for redundant headers, a check is performed (720) to determine if the current cell has the needed header embedded in the MPEG stream. The start of all frames is cell aligned, so if the first 32 bits of the cell is a MPEG start code, the needed headers will be available to the MPEG decoder within the MPEG stream. If the decoder is waiting for a redundant header, and it is not embedded, then the good cell is skipped (725). If the decoder is waiting for a redundant header, and it is embedded, the control flags waiting for redundant headers are set false, and the cell is forwarded (730) to the MPEG decoder.

If the cell is a Redundant cell type (test 800), and the transport decoder is not waiting for redundant information (810), the redundant data is skipped (815), and the remaining data in this cell is forwarded to the MPEG decoder. If the cell is a Redundant cell type (test 800), and the transport decoder is waiting for redundant information (test 810), the control flags waiting for redundant headers are set false, the redundant header information from this cell is forwarded (820) to the MPEG decoder, followed by an error token (825), so that the MPEG decoder will look for the next start-code when decoding resumes. And finally the MPEG data of this cell is extracted and forwarded (830) to the MPEG decoder.

What is claimed is:

1. In a digital video transmission system for transmitting MPEG compressed video signal including hierarchically layered data, respective layers including headers containing data descriptive of said respective layers, and one of such layers being a slice layer which includes a slice start code and a group of macroblocks of pixel representative information; said slice start code including an invariant portion and a variable portion; apparatus for segmenting said compressed video signal into transport cells, respective transport cells containing a payload including a portion of said compressed video signal, and a transport header including data descriptive of data contained in said payload; said apparatus comprising:
   a source of said compressed video signal;
   means, responsive to said compressed video signal, for excising therefrom said slice start codes, and dividing the compressed video signal with slice start codes excised therefrom into payload cells of no more than K data bits where K is a predetermined integer;
   means, responsive to header data of said compressed video signal, for generating transport header data including information which identifies compressed video signal included in a corresponding payload; and
   means for concatenating said transport headers with corresponding payloads to form transport cells for the conveyance of compressed video signal.

2. The apparatus set forth in claim 1 further including means for generating error indicating information the loss or alteration of which will indicate a transmission error, and means for including said error indicating information in respective transport cells.

3. The apparatus set forth in claim 1 further including:
   means responsive to said compressed video signal and data included in said respective payloads for generating entry pointers which indicate the location of the beginning of respective slices in respective payloads; and
   means for including said entry pointers in transport headers of transport cells containing the corresponding payloads.

4. In a digital video transmission system for transmitting a hierarchically layered compressed video signal wherein respective layers of compressed signal include headers containing data descriptive of said respective layers, one of such layers being a slice layer which includes a slice start code and a group of macroblocks of pixel representative information; said slice start code including an invariant portion and a variable portion, apparatus for segmenting said hierarchically layered compressed video signal into transport cells. respective transport cells containing a first predetermined number, N, of data bits divided between a transport cell header including a second predetermined number, K, of data bits and a payload of N-K compressed video signal data bits, said transport cell header data bits containing information for identifying compressed video signal data bits of corresponding payloads, said apparatus comprising:
   means for excising said slice start codes from said compressed video signal and for segmenting said compressed video signal with slice start codes excised into fixed length payloads and forming respective payloads into transport cells; and
   means for generating entry pointers indicating the relative location within respective payloads, of the location within the compressed video signal at which respective slice start codes were excised, and including said entry pointers within corresponding transport headers.

5. Receiver apparatus for receiving MPEG compressed video signal of the type arranged in transport cells, each of which includes a transport header and a payload containing a portion of said compressed video signal said compressed video signal having a slice layer of a plurality of slices, each of which originally included slice start codes, and said slice start codes being excised in the formation of respective pay loads, said apparatus comprising;
   a source of said transport cells;
   a source of slice start codes;
   means responsive to transport header data of respective transport cells for determining whether respective transport cells include the beginning of a slice of data, and the location of said beginning of a slice of data;
   means responsive to said transport cells for separating transport headers and payloads and responsive to a determination of the location of said beginning of a slice of data, for inserting a slice start code provided from said source of slice start codes;
   an MPEG video signal decompressor; and
   means for coupling payloads with slice start codes inserted therein to said MPEG video signal decompressor.

6. In a digital video transmission system for transmitting hierarchically layered compressed video signal in transport cells, said hierarchically layered compressed video signal including a slice layer, respective slices including a slice start code and a plurality of blocks of data representing pixel information, and wherein respective transport cells include a transport header and a payload of a portion of said hierarchically layered compressed video signal from which respective slice start codes have been excised, and said transport header including entry pointer data related to the location in respective payloads from which said slice start codes were excised; receiver apparatus comprising:

means for receiving transmitted said transport cells and separating said transport cell headers and payloads;

means responsive to transport cell header data for providing data representing said slice start codes which were excised and inserting same in the compressed video signal locations from which said slice start codes were excised; and decompression means, responsive to said payload data with data representing said slice start codes inserted, for providing decorepressed video signal.

* * * * *